W. W. Neal,
Washing Machine,
Nº 19,257. Patented Feb. 2, 1858
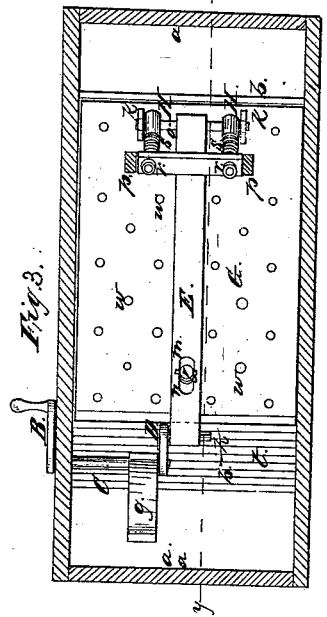
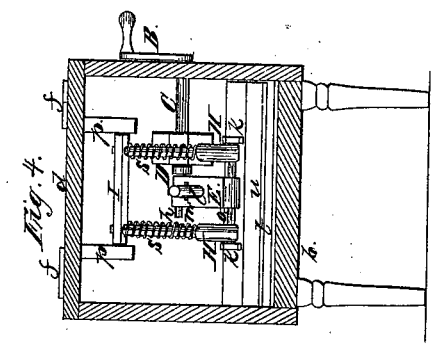
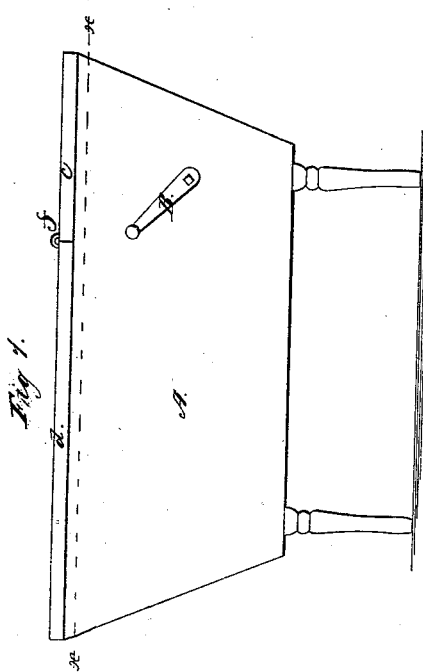
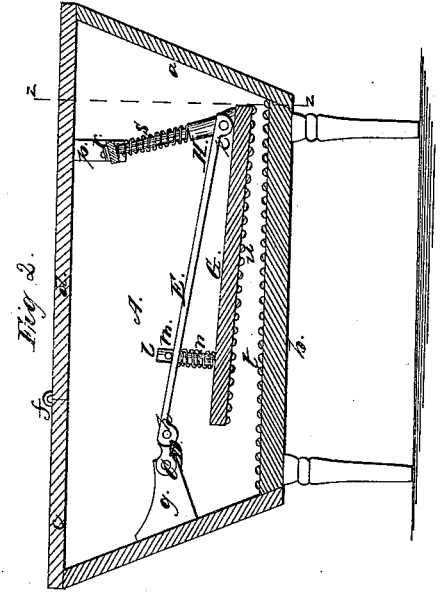

UNITED STATES PATENT OFFICE.

W. W. NEAL, OF YELLOW SPRINGS, OHIO.

WASHING-MACHINE.

Specification of Letters Patent No. 19,257, dated February 2, 1858.

*To all whom it may concern:*

Be it known that I, W. W. NEAL, of Yellow Springs, in the county of Greene and State of Ohio, have invented a new and Improved Washing-Machine; and I do hereby declare that the following is a full and exact description thereof, reference being had to the accompanying drawings, making part of this specification, Figure 1, being a side elevation of the machine; Fig. 2, a longitudinal vertical section thereof in the plane indicated by the line $y\ y$, Fig. 3; Fig. 3, a horizontal section in the plane indicated by the line $x\ x$, Fig. 1; Fig. 4, a transverse, vertical section in the plane indicated by the line $z\ z$, Fig. 2.

Like letters designate corresponding parts in all the figures.

I make use of an oblong box A, of any desirable dimensions, the ends thereof flaring upward to allow sufficient room for the rubber to work in, and to facilitate the insertion and withdrawal of the clothes. The cover of the box is made in two parts; one part $c$, being about one third of the entire length, and permanently secured to the box; and the other part $d$, being hinged, at $f$, to the fixed part. To the inside of that end of the box which is beneath the fixed part $c$, of the cover, is secured a bearing $g$, for supporting the inner end of a shaft C, the outer end thereof being supported by one side of the box or tub, through which it extends. To the outer end of this shaft is attached a winch B, by which the machine is actuated; and to the inner end thereof is secured a crank D. The situation of this crank is near one end of the box, and about midway from side to side, and from top to bottom; or such as to suit the proper arrangement of the other parts of the machine. A connecting bar E, is hinged, at one end, upon the wrist $h$, of said crank, and extends thence forward to near the other end of the box, where it is hinged or secured to a roller $o$, which turns in ears, or bearings, $k, k$, projecting upward from the rubber G. From the said rubber, near the other end thereof, a rigid standard $l$, projects upward through a hole, or slot, $i$, in the connecting bar E, over which a pin $m$, (or its equivalent,) passes through said standard, in order to support that end of the rubber at the proper height. Between the rubber and connecting bar a coiled spring $n$, is placed around the standard, in order to insure a sufficient pressure of the rubber downward upon the clothes, but, at the same time, to allow the rubber to yield and adapt itself to different quantities of clothes.

From the under side of the hinged cover $d$, near its front end, project downward two ears, or hangers, $p, p$, in which turns a roller I. From the roller $o$, two connecting rods H, H, extend upward through apertures in said roller I, and are prevented from being withdrawn therefrom by nuts, (or pins,) $r, r$, above the roller. These connecting rods allow the front end of the rubber G, to hang nearly down to the bottom $b$, of the box; and in order to allow this end of the rubber to yield and adapt itself to the quantity of clothes beneath, coiled springs $s, s,$ are placed on the connecting rods H, H, below the roller I, so that pressure from beneath will force the connecting rods upward through said roller more or less.

The lower surface of the rubber G, and the upper surface of the bottom $b$, are either fluted crosswise, or have semi-cylindrical slats secured thereto, at suitable intervals, as shown at $r, u$, Fig. 2.

The machine being thus constructed, by turning the winch B, a reciprocating motion is communicated to the rubber G; and, at the same time, while the front end thereof remains nearly at a constant height, the rear end is alternately raised and lowered by the direct action of the crank. Thus both a rubbing action and an intermitting, pressing action are produced simultaneously on the clothes—the best that can be adopted; and by allowing one end of the rubber to simply move backward and forward, the positions of the clothes are continually changed, so as to subject different surfaces to action. If the clothes work too much in one direction, by reversing the motion of the winch, the tendency of the clothes will be in the other direction.

The peculiar connection of the working parts of the machine with the cover and box, arranged as described, is very convenient; since, when the cover is lifted, the rubber and its appendages are moved out of the way, leaving a free space for putting in and taking out the clothes, and for handling and wringing them in the box.

What I claim as my invention and desire to secure by Letters Patent, is—

The arrangement and combination of the rubber G, connecting bar E, crank D, yielding standard *n*, (or its equivalent,) and yielding suspending rods H, H, substantially in the manner and for the purposes herein described.

W. W. NEAL.

Witnesses:
J. L. METCALFE,
WM. H. SCHOFIELD.